(12) United States Patent
Dirks et al.

(10) Patent No.: US 6,748,664 B2
(45) Date of Patent: Jun. 15, 2004

(54) GEAR HEAD

(75) Inventors: Rudolf Dirks, Weinstadt (DE); Klaus Langhans, Weinstadt (DE)

(73) Assignee: Andreas Stihl AG & Co. (DE)

( * ) Notice: Subject to any disclaimer, the term of this patent is extended or adjusted under 35 U.S.C. 154(b) by 308 days.

(21) Appl. No.: 09/848,575

(22) Filed: May 2, 2001

(65) Prior Publication Data

US 2001/0037576 A1 Nov. 8, 2001

(30) Foreign Application Priority Data

May 2, 2000 (DE) ........................................ 100 21 339

(51) Int. Cl.$^7$ ................................................. A01D 1/08
(52) U.S. Cl. ............................. 30/276; 30/329; 30/347
(58) Field of Search ..................... 30/276, 347, 329, 30/339, 342, 388, 389; 56/255; 83/651, 663, 665, 666, 698.11, 698.41

(56) References Cited

U.S. PATENT DOCUMENTS

| | | | | |
|---|---|---|---|---|
| 248,963 A | * | 11/1881 | Thomas et al. ................ | 83/666 |
| 307,665 A | * | 11/1884 | Long ............................ | 83/666 |
| 1,286,799 A | * | 12/1918 | Schuler ....................... | 83/666 |
| 2,709,883 A | * | 6/1955 | Pascucci ..................... | 56/255 |
| 3,453,732 A | * | 7/1969 | Wilkin ........................ | 30/276 |
| 4,428,120 A | * | 1/1984 | Kobayashi et al. ........... | 83/666 |
| 4,708,041 A | * | 11/1987 | Granger ..................... | 451/398 |
| 5,103,561 A | * | 4/1992 | Harada et al. ................ | 30/276 |
| 5,737,985 A | * | 4/1998 | Rimlinger, Jr. .............. | 82/112 |
| 6,032,369 A | * | 3/2000 | Tada et al. .................... | 30/276 |
| 6,279,919 B1 | * | 8/2001 | Turos .......................... | 82/112 |
| 6,508,004 B2 | * | 1/2003 | Tezuka et al. ................ | 30/276 |

FOREIGN PATENT DOCUMENTS

| | | |
|---|---|---|
| DE | 195 42 144 | 5/1996 |
| FR | 1360283 | 3/1964 |
| GB | 2 187 926 | 9/1987 |

OTHER PUBLICATIONS

Patent Abstracts of Japan JP 07327453.

* cited by examiner

*Primary Examiner*—Boyer Ashley
*Assistant Examiner*—Thomas J. Druan, Jr.
(74) *Attorney, Agent, or Firm*—R W Becker & Associates; R W Becker

(57) ABSTRACT

A gear head for a manually guided power implement is provided. Part of the tool shaft, which receives a rotatable cutting tool, is embodied as a cylindrical splined shaft having grooves for the positive transmission of torque to the cutting tool. An abutment plate is disposed on the tool shaft and has an abutment surface that extends essentially perpendicular to the longitudinal axis of the tool shaft. A centering cylinder extends through a circular central opening of the cutting tool and has inwardly directed longitudinal ribs that engage in the grooves of these splined shaft. A free end of the centering cylinder is provided with a beveled portion that extends from an outer contour of the cylinder to into the grooves.

10 Claims, 4 Drawing Sheets

GEAR HEAD

BACKGROUND OF THE INVENTION

The present invention relates to a gear head of a manually guided power implement.

Such gear heads, especially of a brush cutter or the like, are provided with a tool shaft which is driven by a motor and by means of which a rotatable cutting tool, such as a saw blade, a mowing tool, a filament drum, or the like is driven. Part of the drive shaft is embodied as a cylindrically splined shaft having essentially coaxial grooves. Provided in this region are a pressure plate and an abutment plate having an abutment surface that is disposed essentially perpendicular to the longitudinal axis of the tool shaft, whereby the cutting tool is held between the abutment plate and the pressure plate at right angles to the axis of rotation. The abutment plate, the pressure plate, or even both components have a central opening that surrounds the tool shaft and on the inner side of which ribs are provided that are in engagement with the grooves. This provides a positive connection between the tool shaft and the abutment plate and/or the pressure plate in the direction of rotation. The cutting tool itself is clamped in a flush manner between the abutment plate and the pressure plate, whereby the transfer of torque is effected by frictional engagement.

Due to the high operating speed, it is necessary to provide a precise centering of the cutting tool in order to avoid an out of balance situation. For this purpose, the cutting tool has a circular central opening, the diameter of which is greater than that of the splined shaft. The abutment plate is provided with a central, cylindrical centering shoulder that engages in the circular opening of the cutting tool and ensures the ability of the tool to run true. Unfortunately, in practice mounting of the cutting tool is cumbersome and time consuming. The centering collar has a very low height that corresponds approximately to the thickness of the cutting tool. As a result, a cutting tool that has been correctly placed upon the abutment plate and the centering collar thereof can slide out of this position when the pressure plate is tightened, which makes the placement or exchange of the cutting tool unnecessarily difficult. If the cutting tool is clamped in a non-centered position, the resulting eccentricity effects an occasionally considerable vibration, which can mechanically greatly stress in particular the gear head. A recentering of the cutting tool is complicated, since the implement must be shut down and the clamping mechanism must again be released.

The aforementioned drawbacks are aggravated by a protective disk that is arranged between the cutting tool and the abutment surface of the abutment plate. The protective disk is held on the abutment plate together with the cutting tool, and is centered by the centering collar. A sliding of the cutting tool also permits a sliding or tilting of the protective disk, which increases the out of balance situation.

It is therefore an object for the present invention to improve a gear head of the aforementioned general type in such a way that a reliable centered mounting of a cutting tool is simplified.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
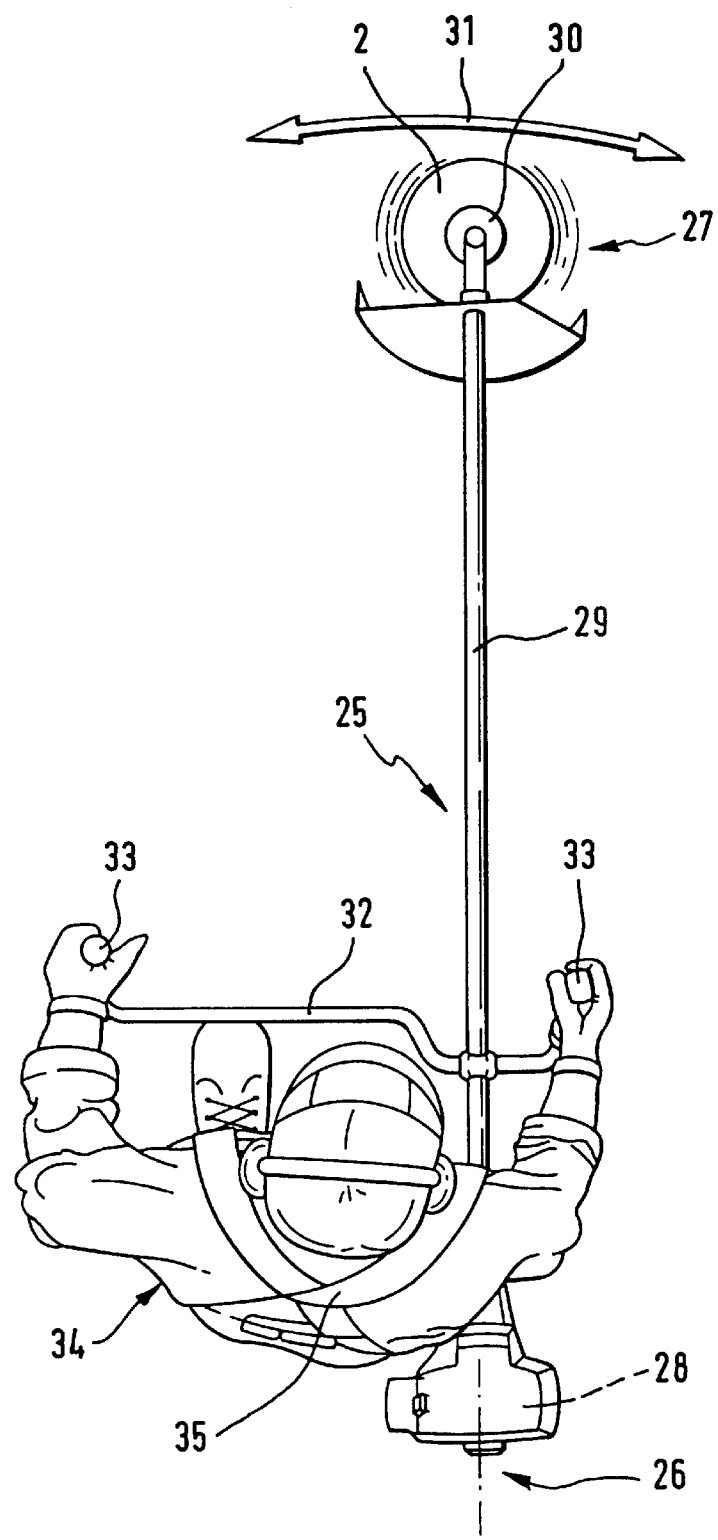
FIG. 1 is a general view of a brush cutter having one exemplary embodiment of the inventive gear head.

The gear head of the present invention is characterized primarily by a centering cylinder that extends through a circular central opening of the cutting tool, wherein the centering cylinder is provided with inwardly directed longitudinal ribs that engage in the grooves of the splined shaft, and wherein the free end of the centering cylinder is provided with a beveled portion that extends from the outer contour of the centering cylinder to into the grooves.

It is proposed pursuant to the present invention to provide an approximately tubular centering cylinder for the cutting tool, wherein longitudinal ribs that engage in the grooves of the splined shaft are provided on the inner side of the centering cylinder. In addition, the centering cylinder has a free end that can extend through a circular opening of the cutting tool. This free end is provided with a beveled portion that extends from the outer contour of the centering cylinder to into the grooves. This provides a ramp-shaped contour of the free end that extends into the grooves and therefore does not form an end face upon which a non-centered cutting tool could rest and be clamped in position. If the cutting tool is not properly placed upon the centering cylinder, then when the clamping mechanism is tightened the beveled portion presses into the circular opening of the cutting tool, and the cutting tool is pressed upon the centering cylinder. This considerably simplifies the mounting process of the cutting tool, and to a large extent precludes an erroneous mounting.

Pursuant to one preferred specific embodiment of the present invention, the beveled portion is in the form of a truncated cone, the smaller end face diameter of which is less than the outer diameter of the splined shaft. As a result, the outer contour of the centering cylinder, with its beveled portion, can be produced as a simple turned part. In this connection, an advantageous flank angle of the beveled portion, relative to the longitudinal axis of the tool shaft, is approximately 30° to 60°, and in particular 45°.

Pursuant to a further advantageous specific embodiment to the present invention, the centering cylinder is embodied as a separate mounting sleeve, the beveled portion end of which is directed towards the abutment plate. In this way, the cutting tool can first be pressed upon the centering cylinder; subsequently, the cutting tool together with the centering cylinder are pressed upon the tool shaft. As a result, the cutting tool is temporarily protected from sliding until the subsequent tightening of the pressure plate. In conjunction with a receiving recess in the abutment plate, the centering cylinder can be relatively long without producing an overall increase in the height of the gear head; in addition, this provides a guidance for the loosely inserted cutting tool. A connection of the pressure plate to the mounting sleeve reduces the number of individual parts that have to be handled. During the mounting process, the pressure plate acts as an abutment for the cutting tool that is to be pressed on. In particular via a fixed connection between the pressure plate and the mounting sleeve, a reliable transfer of torque from the tool shaft to the cutting tool is provided by the grooves and longitudinal ribs of the mounting sleeve. In this connection, a monolithic construction of the pressure plate and the mounting sleeve can be advantageous. To further improve the transfer of torque from the tool shaft to the cutting tool, a central opening of the abutment plate that is pressed on to the tool shaft can also be provided with inner ribs that are in engagement with the grooves of the splined shaft and contribute to the transfer of torque.

In conjunction with the aforementioned receiving recess in the abutment plate, an appropriate protective disk, which is disposed between the cutting tool and the abutment plate, is expediently provided in the region of its mounting opening with inwardly directed, angled-off spring tabs that extend into the receiving recess and that about the periphery rest against the tool shaft in an elastically resilient manner. As a result of the spring tabs, during the mounting process of the cutting tool the protective disk is reliably protected from sliding, and can therefore, if necessary, be easily withdrawn by hand from the tool shaft.

Further specific features of the present invention will be described in detail subsequently.

DESCRIPTION OF PREFERRED EMBODIMENTS

Figure 2:
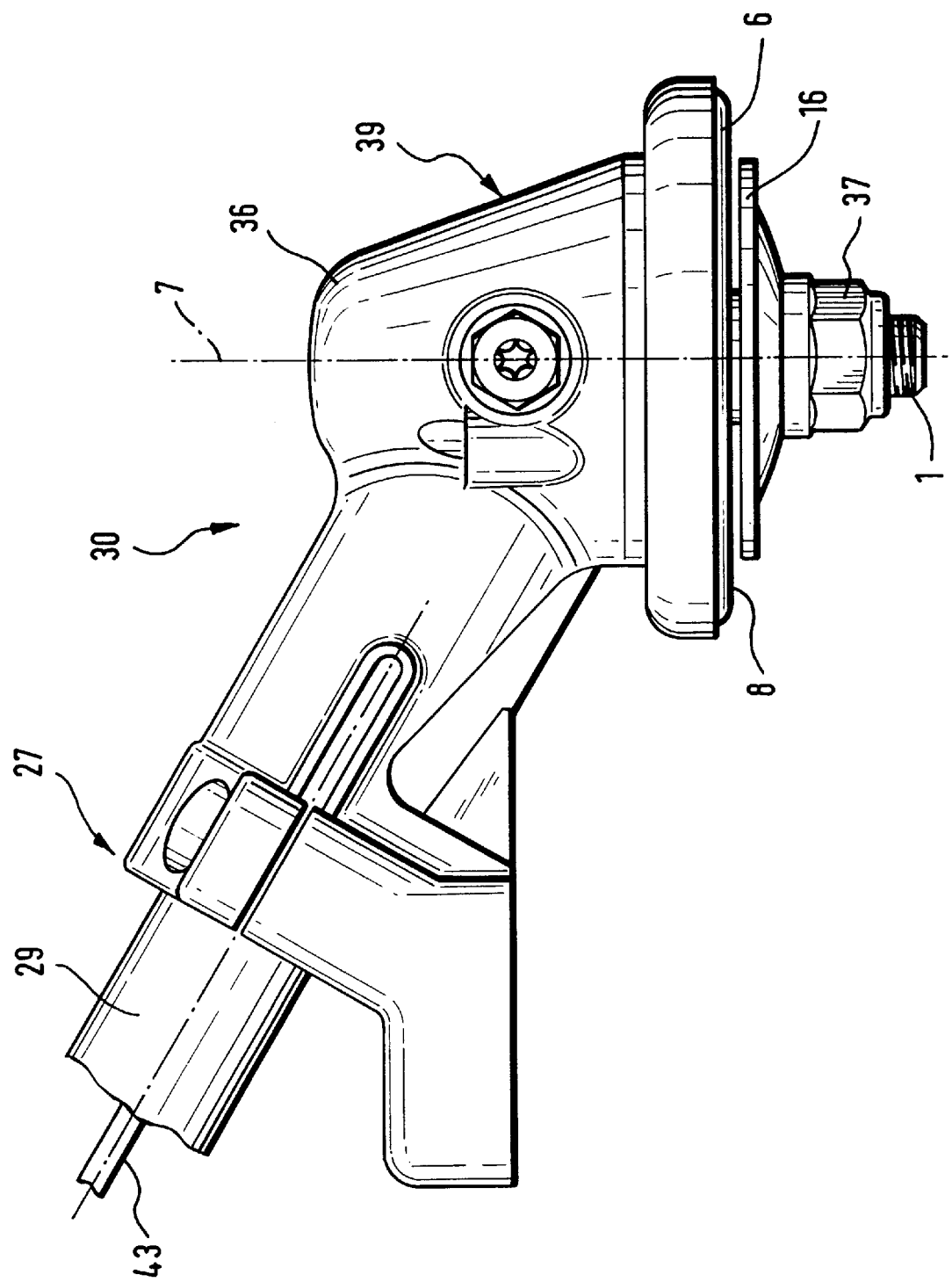
FIG. 2 is a side view of the tool or gear head of FIG. 1.

Referring now to the drawings in detail, the general view of FIG. 1 shows a gear head 30 that is mounted, for example, on the tool end 27 of a brush cutter 25. A gear head 30 embodied pursuant to the present invention can also be provided for angle sanders or the like. A rotatable cutting tool 2 is held on the gear head 30; the cutting tool 2 is driven by a motor 28 that is disposed on the motor end 26 of the brush cutter 25. The motor 28 and the gear head 30 are connected by a drive shaft 43 that is indicated in FIG. 2 and is guided in a guide rod or tube 29. The brush cutter 25 is held on an operator 34 by a carrying strap 35, and is guided approximately along the direction indicated by the double arrow 31 via a steering or handle bar 32 that is secured on the guide tube 29 and is provided with two handles 33.

The gear head 30 of the brush cutter 25 of FIG. 1 is illustrated in a side view in FIG. 2. The tool end 27 of the guide tube 29 is held in a housing 36, whereby the drive shaft 43 drives a tool shaft 1 by means of a miter gear mechanism 39 that is disposed in the housing 36 and is shown in greater detail in FIG. 3. Disposed on the tool shaft 1 is an abutment plate 6 that is fixedly connected with the tool shaft and has an abutment surface 8; also disposed on the tool shaft 1 is a pressure plate 16. A non-illustrated cutting tool 2, by means of a nut 37, can be clamped between the pressure plate 16 and the abutment surface 8 essentially perpendicular to the longitudinal axis 7 of the tool shaft 1.

Figure 3:
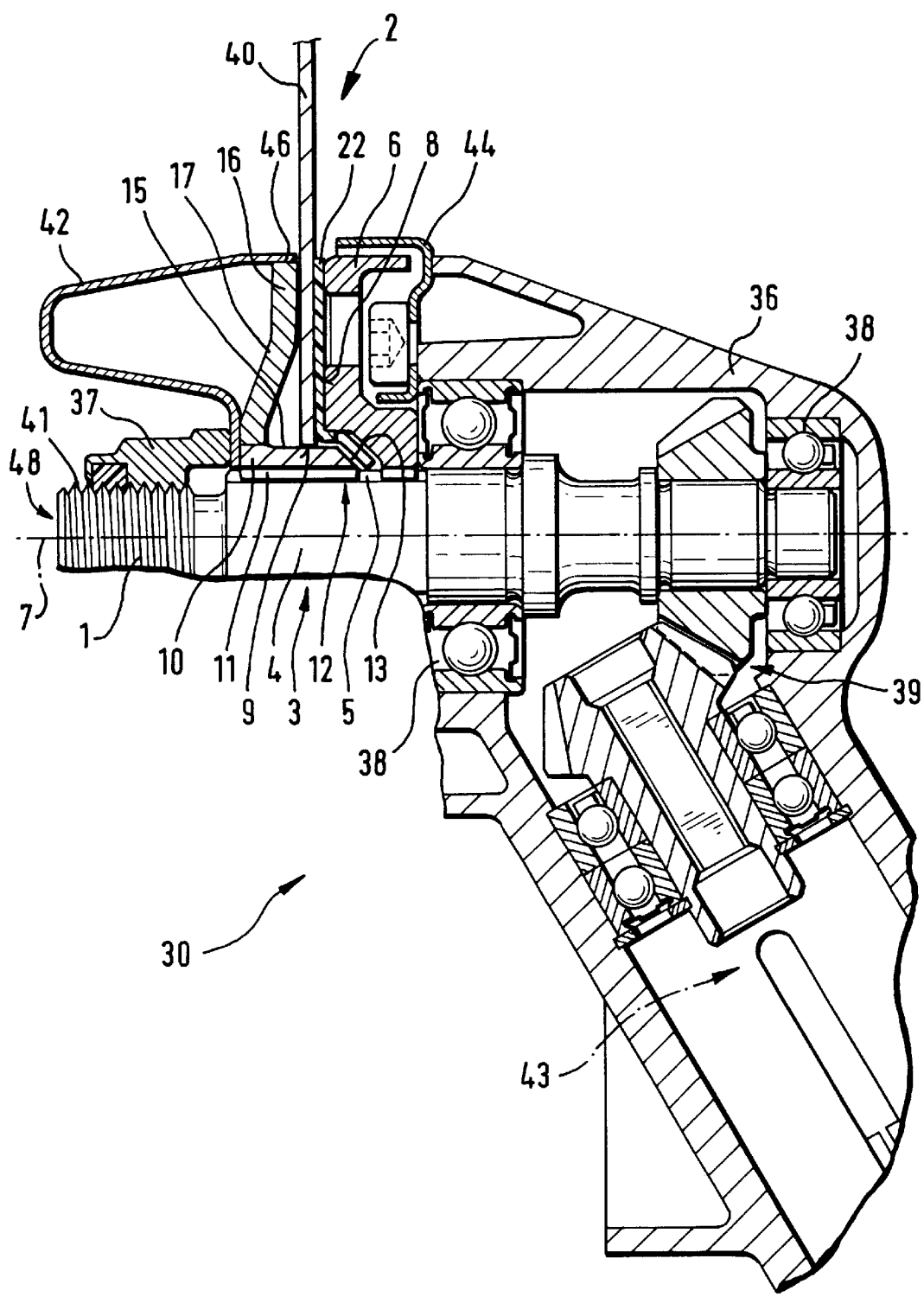
FIG. 3 is a cross-sectional view showing details of the gear head of FIG. 2, in which is mounted a saw blade.

The cross-sectional illustration of FIG. 3 shows the gear head of FIG. 2 with a clamped-in cutting tool 2 in the form of a circular saw blade 40. Instead of the saw blade 40, a mowing tool, a filament drum, etc. can be clamped in. The tool shaft 1 is supported in the housing 36 of the gear head 30 by means of two ball bearings 38 and is driven by the drive shaft 43 via the miter gear mechanism 39. The tool shaft 1 is provided with a part 3 that is embodied as a splined shaft 4 having grooves 5 that are disposed parallel to the longitudinal axis 7. The abutment plate 6 is fixedly connected to the tool shaft 1 and has the abutment surface 8 for the cutting tool 2, with the abutment surface 8 being disposed essentially perpendicular to the longitudinal axis 7. A centering cylinder 10 extends through a central circular opening 9 of the cutting tool 2, thereby centering the tool relative to the longitudinal axis 7. The centering cylinder 10 can be embodied as a centering collar of the abutment plate 6, and in the illustrated embodiment is a separate mounting sleeve 15, on the inner side of which are disposed longitudinal ribs 11 that engage in the grooves 5 and thereby produce a positive, fixed connection with the tool shaft 1. At that end that faces away from the abutment plate 6, the mounting sleeve 15 is mechanically fixedly connected with the pressure plate 16, which is embodied as a cup spring 17. A frictional connection between the two components can also be expedient. At its free end 12, the mounting sleeve 15 is provided with a beveled portion 13, which will be described in greater detail subsequently in conjunction with FIG. 4. Disposed between the cutting tool 2 and the abutment plate 6 is a support disk 22, that at its periphery is slightly spaced from a guard or cover 44 that is secured to the housing; this protects the gear head 30 from dirt particles that are churned up. The free end 48 of the tool shaft 1 is provided with a thread 41 on to which the nut 37 is screwed. A quick-clamping device or the like can also be provided in place of the nut 37. As a consequence of the pressure of the tightened nut 37, the cutting tool 2 is pressed against the abutment surface 8 by means of the pressure plate 16 and is frictionally held. By embodying the pressure plate 16 as a cup spring 17, the pressure is maintained against the cutting tool 2 even during dynamic loading. A protective guard or cover 42 is held between the nut 37 and the unit comprised of the mounting sleeve 15 and the pressure plate 16; the guard 42 is centered against a circumferential rim 46 of the pressure plate 16.

Figure 4:
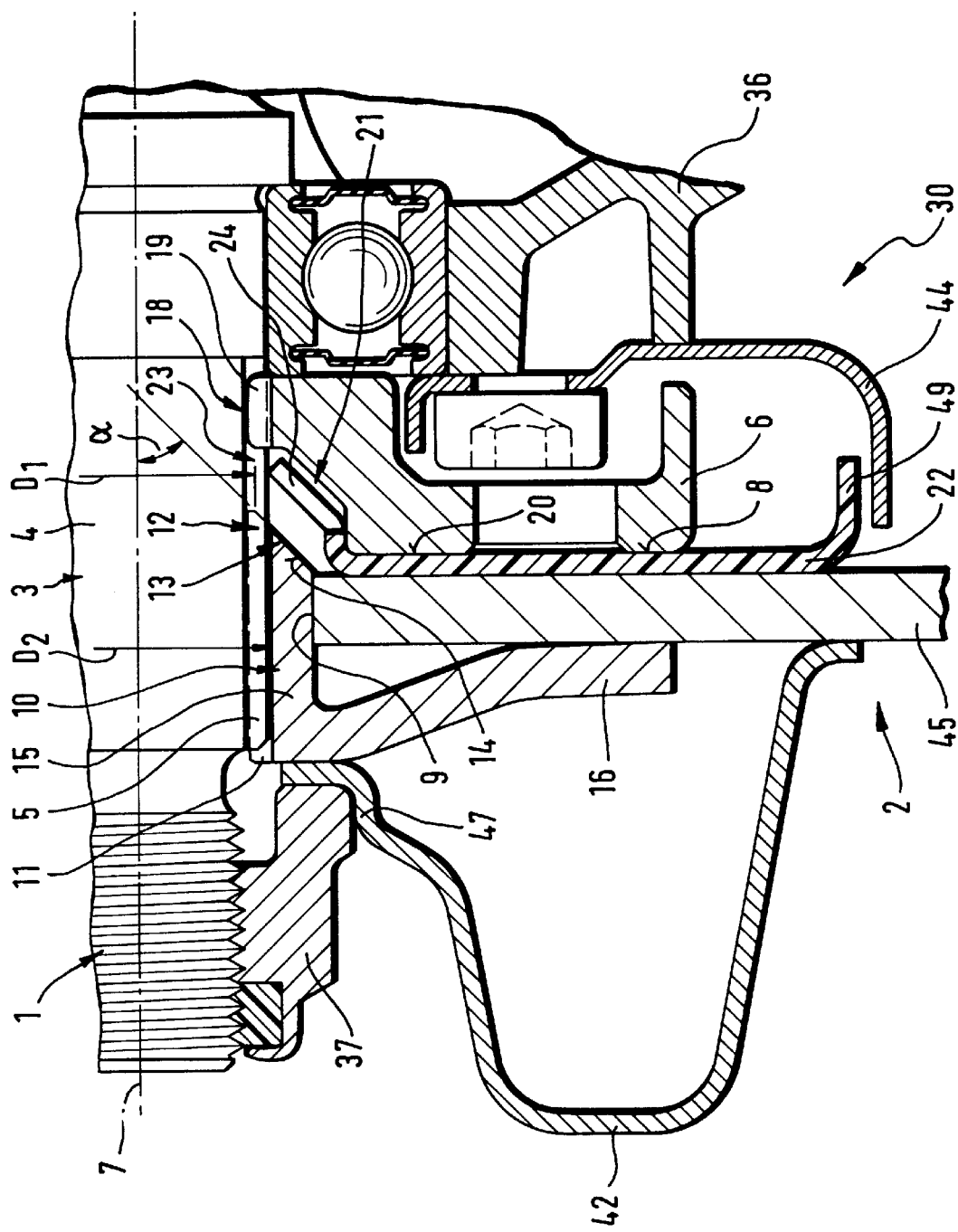
FIG. 4 is a cross-sectional view of the gear head of FIG. 2 showing further details and a mounted mowing tool.

In the cross-sectional view of the portion of the gear head 30 of FIG. 2 shown in FIG. 4, the clamped-in cutting tool 2 is a mowing tool 45. Clamped between the mowing tool 45 and the abutment surface 8 of the abutment plate 6 is a protective disk 22, the diameter of which is greater than the diameter of the abutment plate 6, with the circumferential, angled-off rim 49 at the periphery of the protective disk 22 extending into and spaced slightly radially from the cover 44. A protective guard or cover 42 that is appropriate to the mowing tool 45 is clamped in between the nut 37 and the pressure plate 16, whereby the protective cover 42 is provided on the inwardly facing side with a shoulder 47 for the centering against the nut 37. The mounting sleeve 15 and the pressure plate 16 are a single piece. In the illustrated embodiment, the beveled portion 13 on the mounting sleeve 15 is embodied as a truncated cone 14. It can also be expedient to embody the beveled portion 13 in the form of, for example, a milled truncated pyramid or the like. The beveled portion has a flank angle $\alpha$ of about 45° relative to the longitudinal axis 7 of the tool shaft 1, and extends from the outer contour of the centering cylinder 10 to into the grooves 5, whereby the smaller diameter D 1 of the end face of the truncated cone 14 is smaller than the outer diameter D 2 of the splined shaft 4. The abutment plate 6 is provided with a central opening 18, on the inner side of which inwardly facing ribs 19 are provided. The ribs 19 are in engagement with the grooves 5 of the tool shaft 1 and produce a positive, fixed connection of the two components. A receiving recess 21 is provided on that side 20 of the abutment plate 6 that faces the cutting tool 2, in the region of the opening 18; the free end 12 of the mounting sleeve 15, at the truncated cone end thereof, extends into and is spaced from the receiving recess 21. The protective disk 22 is provided with a central mounting opening 23 that surrounds the tool shaft 1 and in the region of which are provided inwardly directed, angled-off spring tabs 24 that extend into the receiving recess 21. The spring tabs 24 rest against the tool shaft 1 in an elastically prestressed manner, thereby centering the protective disk 22 and also holding it when the nut 37 is loosened. The remaining features and reference numerals for the gear head 30 of FIG. 4 correspond to those of FIG. 3.

The specification incorporates by reference the disclosure of German priority document DE 100 21 339.1 of May 2, 2000.

The present invention is, of course, in no way restricted to the specific disclosure of the specification and drawings, but also encompasses any modifications within the scope of the appended claims.

What is claimed is:

1. A gear head for a manually guided power implement, comprising:
    a tool shaft for receiving a rotatable cuffing tool, wherein a part of the tool shaft is embodied as a cylindrical splined shaft having grooves for the positive transmission of torque to the cutting tool;
    an abutment plate disposed on said tool shaft and having an abutment surface for the cuffing tool, wherein said abutment surface is disposed essentially perpendicular to a longitudinal axis of said tool shaft; and
    a centering cylinder that extends through a circular central opening of the cutting tool, wherein said centering cylinder is provided with inwardly directed longitudinal ribs that engage in said grooves of said splined shaft, and wherein a free end of said centering cylinder is provided with a beveled portion that extends from an outer contour of said centering cylinder into said grooves, wherein said beveled portion of said centering cylinder is in the form of a truncated cone, a smaller end faced diameter of which is less than an outer diameter of said splined shaft.

2. A gear head according to claim 1, wherein a flank angle of said beveled portion of said centering cylinder is approximately 30° to 60° relative to said longitudinal axis of said toot shaft.

3. A gear head according to claim 1, wherein said centering cylinder comprises a mounting sleeve, and wherein said end that is provided with said beveled portion is directed towards said abutment plate.

4. A gear head according to claim 3, wherein a pressure plate is provided.

5. A gear head according to claim 4, wherein said pressure plate is fixedly connected to said mounting sleeve.

6. A gear head according to claim 4, wherein said pressure plate and said mounting sleeve are a single part.

7. A gear head according to claim 4, wherein said pressure plate is a cup spring.

8. A gear head according to claim 3, wherein said abutment plate has a central opening, an inner side of which is provided with ribs that are in engagement with said grooves.

9. A gear head according to claim 8 wherein said abutment plate, in the region of its central opening, and on a side that faces said cutting tool, is provided with a receiving recess for said mounting sleeve.

10. A gear head according to claim 9, wherein a protective disk is provided between said cutting tool and said abutment plate, and wherein said protective disk has a central mounting opening, in the region of which said protective disk is provided with inwardly directed, angled-off spring tabs that extend into said receiving recess and rest against said tool shaft.

* * * * *